United States Patent [19]

Kinoshita et al.

[11] Patent Number: 5,002,167
[45] Date of Patent: Mar. 26, 1991

[54] ONE-WAY CLUTCH WITH END ALIGNABLE RIBBON SPRING

[75] Inventors: Yoshio Kinoshita, Ayase; Hiroshi Hayasaka, Fujisawa, both of Japan

[73] Assignee: NSK-Warner Kabushiki Kaisha, Tokyo, Japan

[21] Appl. No.: 402,977

[22] Filed: Sep. 5, 1989

Related U.S. Application Data

[63] Continuation of Ser. No. 131,080, Dec. 10, 1987, abandoned.

[30] Foreign Application Priority Data

Dec. 12, 1986 [JP] Japan ................................ 61-295031

[51] Int. Cl.⁵ ............................................. F16D 41/07
[52] U.S. Cl. .................................. 192/41 A; 192/45.1
[58] Field of Search .................. 192/41 R, 41 A, 45.1; 188/82.8

[56] References Cited

U.S. PATENT DOCUMENTS

| | | | |
|---|---|---|---|
| 2,750,019 | 6/1956 | Ferris | 192/45.1 |
| 2,753,027 | 7/1956 | Troendly et al. | 192/45.1 |
| 3,049,205 | 8/1962 | Ferris et al. | 192/45.1 |
| 4,766,987 | 8/1988 | Message | 192/41 A |

Primary Examiner—Richard Lorence
Attorney, Agent, or Firm—Skjerven, Morrill, MacPherson, Franklin & Friel

[57] ABSTRACT

A ribbon spring for use in a sprag-synchronized one-way clutch includes an elongated metal thin plate which is formed with a plurality of sprag insertion holes at a predetermined pitch. The ribbon spring is bent linearly in at least at one location or in a curved form at least partly at least at one end portion, so that the ribbon spring defines a circle which is substantially equal to a true circle when assembled into a one-way clutch.

6 Claims, 5 Drawing Sheets

ONE-WAY CLUTCH WITH END ALIGNABLE RIBBON SPRING

This application is a continuation of application Ser. No. 07/131,080, filed Dec. 10, 1987, now abandoned.

BACKGROUND OF THE INVENTION

1. Field of the Invention

This invention generally relates to a one-way clutch, and, in particular, to a ribbon spring for use in a sprag-synchronized one-way clutch.

2. Description of the Prior Art

FIG. 1 schematically illustrates the overall structure of a sprag-synchronized one-way clutch 1. As shown, the sprag-synchronized one-way clutch 1 is to be used as interposed between an inner ring 2 and an outer ring 3. When the inner and outer rings 2 and 3 rotate relative to each other in the directions opposite to the directions indicated by the arrows, their relative rotation is allowed; on the other hand, when the inner and outer rings 2 and 3 try to rotate relative to each other in the directions indicated by the arrows, the relative rotation is prevented from taking place. The sprag-synchronized one-way clutch 1 includes a pair of ring-shaped outer and inner retainers 4 and 5, and these retainers 4 and 5 are each formed with a plurality of sprag insertion windows or holes 4a and 5a, respectively. Also provided in the sprag-synchronized one-way clutch 1 are a plurality of sprags 6, each having a particular cross-sectional shape which is tapered in the middle. Each of the sprags 6 is inserted into the corresponding one of each of the sprag insertion holes 4a and 5a. Each of the sprags 6 has an outer cam surface 6a, which is defined by one or two or more radii of curvature, and an inner cam surface 6b.

A ribbon spring 7 is interposed between the inner and outer retainers 4 and 5, and a predetermined moment is normally given to each of the sprags 6 in a predetermined direction by the ribbon spring 7. The ribbon spring 7 is also formed with a plurality of sprag insertion holes 7a at a predetermined pitch, and each of the sprags 6 is inserted into the corresponding one of the sprag insertion holes 7a and maintained in position as supported at the middle. The ribbon spring 7 is generally elongated in shape and comprised of a thin plate of a desired material, preferably metal, such as stainless steel. After inserting the sprags 6 into all of the sprag insertion holes 7a, both ends of the ribbon spring 7 are put together to define a circular shape, and such a circularly shaped ribbon spring 7 with the sprags 6 is inserted between the outer and inner retainers 4 and 5. As shown in FIG. 1, when assembled, the ribbon spring 7 normally applies moment to each of the sprags 6 in the directions indicated by the arrows A, so that each of the sprags 6 is biased to be in contact with the inner and outer rings 2 and 3, to provide a coupling condition.

The structure of a typical prior art ribbon spring 7 is illustrated in FIGS. 2a and 2b. The ribbon spring 7 is typically comprised of an elongated thin plate of a metal, such as stainless steel, which is formed with a plurality of sprag insertion holes 7a, each generally in the shape of a letter "C" located at a predetermined pitch. A tab 7d is formed in each of the sprag insertion hole 7a as extending into the hole 7a from one side thereof. FIG. 2b is a side view of the ribbon spring 7 shown in FIG. 2a. The illustrated ribbon spring 7 includes a pair of elongated side sections 7b and 7b and a plurality of cross-bars or bridge sections 7c arranged at a predetermined pitch along the longitudinal direction of the ribbon spring as bridging between the pair of side sections 7b and 7b. And, each of the sprag insertion holes 7a is defined by the pair of side sections 7a and 7a and a pair of adjacent bridge sections 7c and 7c.

The tab 7d is formed as a projection which projects into the corresponding sprag insertion hole 7a from one side of the corresponding bridge section 7c, so that the sprag insertion hole 7a is generally in the shape of a letter "C." The ribbon spring 7 serves to apply a predetermined moment to the sprag 6 in the direction indicated by the arrows in FIG. 1 so as to keep the sprag 6 biased to be in contact with the inner ring 2 and also with the outer ring 3. For this reason, it is necessary for the tab 7d to apply an appropriate pressure force to the associated sprag 6. In addition, a plurality of wavy or crooked portions 7e are formed in the ribbon spring 7 at a predetermined pitch along the longitudinal direction of the ribbon spring 7. In the illustrated embodiment, the crooked portions 7e are provided at the same pitch as that of the sprag insertion holes 7a and with a different phase. These wavy or crooked portions 7e are formed by locally bending portions of a thin plate at the same side in a predetermined shape, and each of the crooked portions 7e is formed in the pair of side sections 7b and 7b and the tab 7d in a transverse direction.

FIG. 3 illustrates the condition in which sprags 6 are inserted into the respective sprag insertion holes 7a of the ribbon spring 7 shown in FIGS. 2a and 2b and the both ends of the ribbon spring 7 are brought together to form a circular shape to be ready for assembling into the one-way clutch 1. In this manner, the prior art ribbon spring 7 extends straight in its longitudinal direction before assemblage, both ends of the ribbon spring 7 must be brought together to form the ribbon spring 7 in a circular or ring shape. In this case, however, when the ribbon spring 7 is formed in a circular shape, both end portions 7' and 7" tend to extend straight. Thus, when such a ribbon spring 7 is assembled into the one-way clutch 1, one end portion 7' of the ribbon spring 7 tends to push the other end portion 7" radially outwardly, so that the tip end of the end portion 7" located radially outwardly of the other end portion 7' comes to be pushed against the inner peripheral surface of the outer retainer 4. In addition, when the ribbon spring 7 is set in position as shown in FIG. 4, the end portion 7' of the ribbon spring 7 also pushes against the other end portion 7". Under this condition, the sprag 6' located at the meeting position between the end portions 7' and 7" of the ribbon spring 7 receives a moment which is different from the moment received by any other sprags 6. As a result, the contact condition between the sprag 6' and each of the inner and outer rings 2 and 3 differs from those of the other sprags 6, so that there is a lack of uniformity in clutch performance in the circumferential direction of the one-way clutch 1.

Furthermore, if the one-way clutch 1 is operated under this condition, every time when the clutch is coupled and decoupled with the end portion 7' being pressed against the end portion 7" and at the same time with the end portion 7" being pressed against the inner peripheral surface of the outer retainer 4, both of the end portions 7' and 7" are scraped against each other and with the outer retainer 4 for the end portion 7" in the circumferential direction repetitively. Thus, the end portions 7' and 7" gradually wear out. In this case, since the end portion 7" is scraped against the outer retainer 4 having a higher rigidity, it tends to be worn out more rapidly. The status of the ribbon spring 7 which has been worn in this manner is indicated in FIG. 4 by the dotted lines. As the end portions 7' and 7" of the ribbon spring 7 wear due to scraping as described above, they tend to be oriented more radially, which would increase the wear of the end portions 7' and 7", thereby causing the sprag 6' to be more unstable. Besides, there is a chance that the bottom of a wrinkle defined by the wavy or crooked portion 7e of the end portion 7' could wear out due to scraping with the outer peripheral surface of the inner retainer 5. Moreover, regarding the ribbon spring 7 itself, the stress at the end portion 7' or 7" becomes higher by the factor of approximately 1.5 to 2.5 as compared with the remaining portion of the ribbon spring 7, so that damage tends to occur especially in the vicinity of the end portion 7' or 7" of the ribbon spring 7.

SUMMARY OF THE INVENTION

In accordance with the principle of the present invention, there is provided a ribbon spring for use in a sprag-synchronized one-way clutch, whose ends are properly aligned substantially with a circle defined by the ribbon spring when set in position. A ribbon spring constructed in accordance with one embodiment of the present invention includes an elongated thin plate of a metal, such as stainless steel, which is formed with a plurality of sprag insertion holes arranged at a predetermined pitch in the longitudinal direction. In accordance with the principle of the present invention, bending is applied to at least one end portion of the thin plate in a predetermined direction. Thus, when the ribbon spring of the present invention is assembled into a sprag-synchronized one-way clutch, both end portions of the ribbon spring will be directed substantially along the circumferential direction, i.e., a circle defined by the ribbon spring bent in the form or a ring, as located one on top of the other. As a result, the ribbon spring may be set in position to define a circle which is substantially close to a true circle as much as possible as a whole. In this manner, since the ribbon spring defines a circle which is substantially close to a true circle as much as possible, the stress acting in the ribbon spring becomes uniform in the circumferential direction and the moment applied to each of the sprags 6 becomes uniform, so that a uniform performance can be obtained for the one-way clutch as a whole.

The intended object of the present invention can be attained by applying a bending process to only one end portion of the ribbon spring; however, in the preferred embodiment, bending is applied to both ends of the ribbon spring to provide a desired shape to both end portions. Regarding the manner of bending, each of the end portions may be processed to bend straight at a predetermined angle at one bending location or a plurality of bending locations; whereas, bending may also be applied to each of the end portions so as to provide a curved shape which is defined by a predetermined radius of curvature or a continuously changing radii of curvature. It should also be noted that such a bending process can be carried out either before insertion of sprags into the ribbon spring or after insertion of sprags into the ribbon spring.

It is therefore a primary object of the present invention to obviate the disadvantages of the prior art as described above and to provide an improved sprag-synchronized one-way clutch.

Another object of the present invention is to provide an improved ribbon spring for use in a one-way clutch.

A further object of the present invention is to provide an improved ribbon spring for use in a sprag-synchronized one-way clutch.

A still further object of the present invention is to provide an improved ribbon spring which can define a circle which is substantially close to a true circle as much as possible when set in position.

A still further object of the present invention is to provide an improved ribbon spring capable of providing an enhanced performance and prolonged life to a sprag-synchronized one-way clutch.

Other objects, advantages and novel features of the present invention will become apparent from the following detailed description of the invention when considered in conjunction with the accompanying drawings.

BRIEF DESCRIPTION OF THE DRAWINGS

FIG. 2b is a side view showing the ribbon spring of FIG. 2a;

FIG. 5b is a side view showing the ribbon spring of FIG. 5a;

DESCRIPTION OF THE PREFERRED EMBODIMENTS

Figure 1:
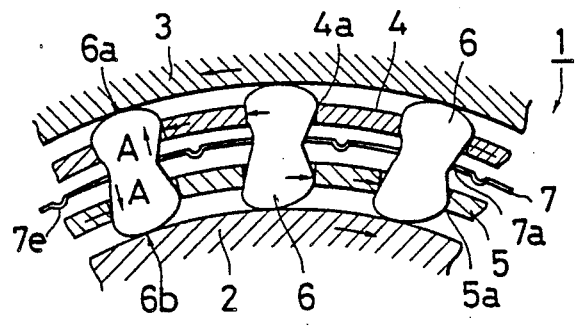
FIG. 1 is a schematic illustration showing the overall structure of a prior art sprag-synchronized one-way clutch.
Figure 2A:
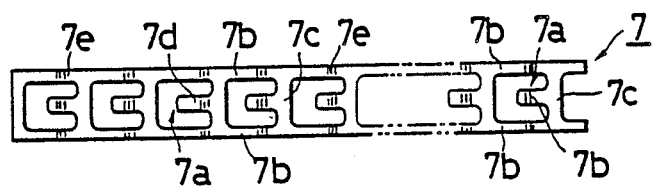
FIG. 2a is a plan view showing schematically a typical prior art ribbon spring for use in a sprag-synchronized one-way clutch.
Figure 2B:
Figure 3:
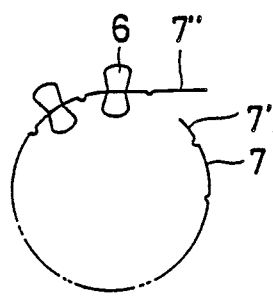
FIG. 3 is an illustration showing the condition in which the prior art ribbon spring is set in position in a circular arrangement.
Figure 4:
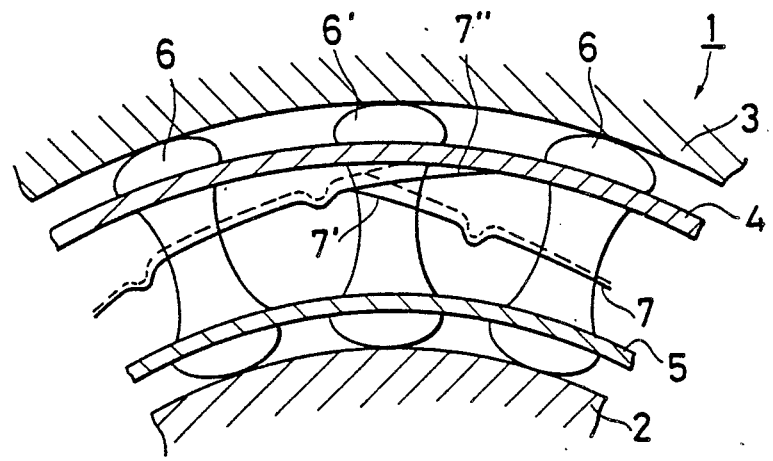
FIG. 4 is an illustration showing the condition how both ends of the prior art ribbon spring are put together when assembled in a sprag-synchronized one-way clutch.
Figure 5A:
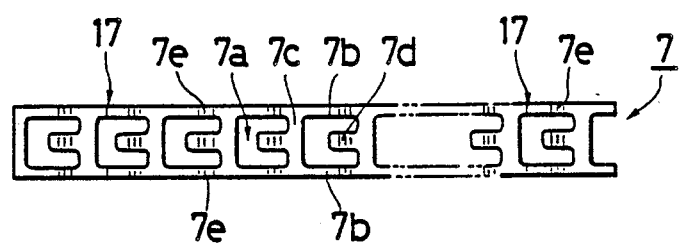
FIG. 5a is a plan view showing schematically a ribbon spring for use in a sprag-synchronized one-way clutch constructed in accordance with one embodiment of the present invention.
Figure 5B:
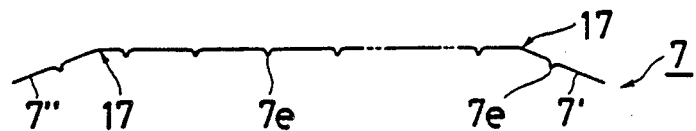

Referring to FIG. 5a, there is schematically shown in plan view a ribbon spring 7 suitable for use in a sprag-synchronized one-way clutch constructed in accordance with one embodiment of the present invention. FIG. 5b is a side view of the ribbon spring 7 shown in FIG. 5a. As shown, the present ribbon spring 7 is similar in the overall structure to the ribbon spring 7 shown in FIG. 2a, so that like elements are indicated by like numerals. Thus, the present ribbon spring 7 shown in FIG. 5a includes a pair of elongated side sections 7b and 7b and a plurality of cross-bars or bridge sections 7c arranged spaced apart from each other at a predetermined pitch bridging between the pair of side sections 7b and 7b. A sprag insertion hole 7a is defined by the pair of side sections 7b and 7b and the pair of two adjacent bridge sections 7c and 7c, and a tab 7d is defined as a projection projecting into the corresponding sprag insertion hole 7a from a predetermined side of the bridge section 7c. In the present embodiment, the sprag insertion hole 7a has a shape generally in the shape of "C", but it may have any other shape, if desired. In addition, the tab 7d may have any desired shape and may be provided in any desired number.

The ribbon spring 7 has an overall elongated shape, and, as shown in FIG. 5b, in the present embodiment, both end portions 7' and 7" are bent linearly at location 17 by bending. In the present embodiment, the bending location 17 is defined at the middle between the two adjacent wrinkles 7e and 7e, which are formed as wavy or crooked portions of the ribbon spring 7. In particular, in the illustrated embodiment, each of the bending locations 17 is set as a transverse line extending across the side sections 7b and 7b without crossing the tab 7d, i.e., between the bridge section 7c and the tab 7d in the longitudinal direction. In addition, the direction of bending applied to each of the end portions of the ribbon spring 7 is the direction in which the wrinkles 7e project. In other words, the wrinkles 7e of the ribbon spring 7 shown in FIG. 5a are provided such that they are located at the inner side and thus project radially inwardly when the ribbon spring 7 is assembled into a sprag-synchronized one-way clutch in the form of a ring. Thus, bending is applied to each of the end portions 7' and 7" such that the end portions 7' and 7" are oriented to substantially follow a circular direction when the ribbon spring 7 is assembled into an associated one-way clutch.

Figure 10:
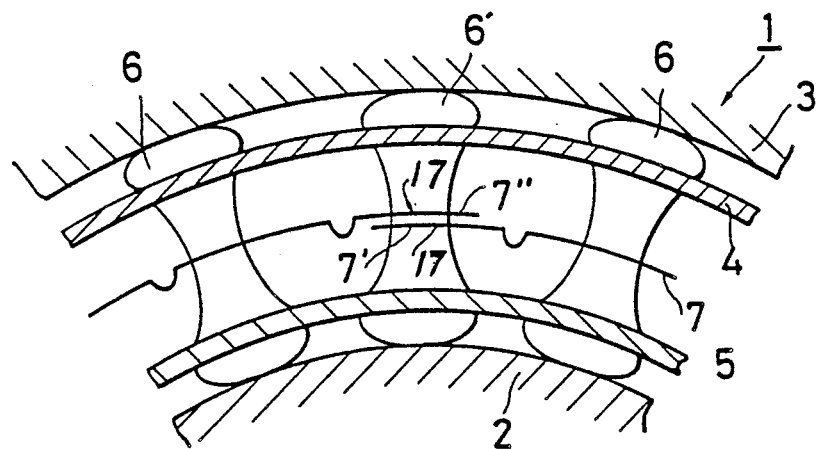
FIG. 10 an illustration showing the condition how both ends of a ribbon spring of the present invention are oriented when assembled into a sprag-synchronized one-way clutch.

FIG. 10 illustrates the condition in which the ribbon spring 7 shown in FIGS. 5a and 5b is assembled into a sprag-synchronized one-way clutch 1. As is clear from FIG. 10, in accordance with the present ribbon spring 7, both end portions 7' and 7" are oriented to substantially follow the circular direction defined by the ribbon spring 7 when assembled into the one-way clutch 1. As a result the ribbon spring 7 is set to define a circle which is substantially close to a true circle as a whole. Thus, the stress acting in the ribbon spring 7 is substantially uniform along its longitudinal direction. In addition, the moment applied to the sprag 6' located at a joint between the end portions 7' and 7" is substantially identical to the moment applied to any other sprag 6, so that there is obtained a well-balanced performance as a one-way clutch 1. Moreover, the end portions 7' and 7" are prevented from scraping against each other or against the outer retainer ring 4 (in the case of the end portion 7") while being pressed radially outwardly. In addition, the scraping between the outer peripheral surface of the inner retainer ring 5 and the ribbon spring 7 is also prevented from taking place. As a result, the ribbon spring 7 is effectively prevented from being worn out or damaged prematurely.

Figure 6A:
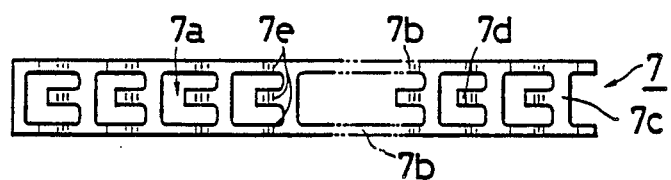
FIGS. 6a and 6b show another embodiment of the present invention in which each end portion of a ribbon spring is bent at two locations.
Figure 6B:
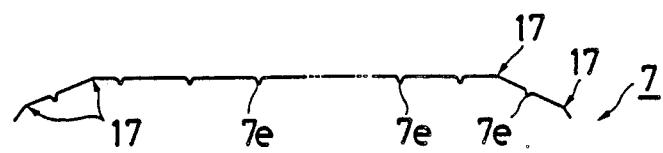
Figure 7A:
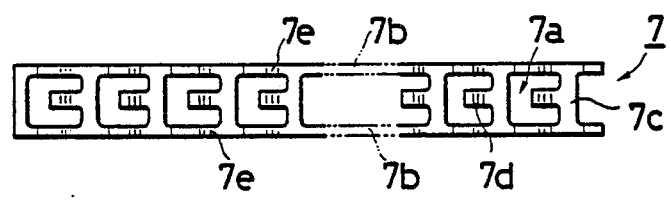
FIGS. 7a and 7b show a further embodiment of the present invention in which each end portion of a ribbon spring is three locations.
Figure 7B:
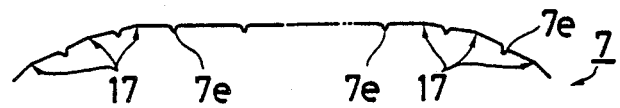
Figure 8:
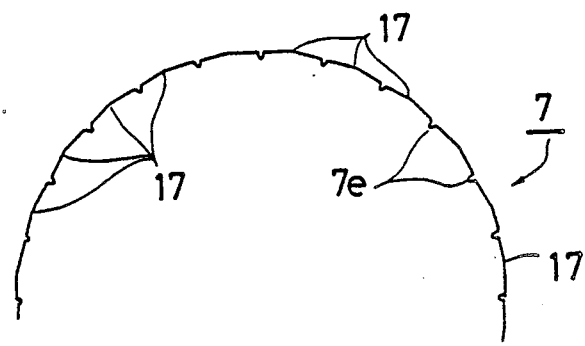
FIG. 8 an illustration showing a ribbon spring constructed in accordance with a still further embodiment in which the ribbon spring is bent at the same pitch as that of s in holes but with a different phase.

Next, another embodiment of the present invention will be described. In the ribbon spring 7 shown in FIGS. 5a and 5b, bending has been applied to both end portions; however, it may be sufficient in some cases to apply bending to only one end portion. FIGS. 6a and 6b show a ribbon spring 7 constructed in accordance with another embodiment of the present invention. In this embodiment, linear bending has been applied to each end portion of the ribbon spring 7 at two locations 17 and 17. When such a linear bending is to be applied at a plurality of locations at each end portion, it is preferable to set the bending locations at each end portion such that the respective bending locations match each other when assembled into a one-way clutch as being bent in the form of a ring. FIGS. 7a and 7b show a ribbon spring 7 constructed in accordance with a further embodiment of the present invention. In this embodiment, linear bending has been applied to each end portion of the ribbon spring 7 at three locations spaced apart from each other in the longitudinal direction. Moreover, FIG. 8 shows a ribbon spring 7 constructed in accordance with a still further embodiment of the present invention. In this embodiment, linear bending has been applied to the ribbon spring 7 at a plurality of locations at the same pitch as that of a plurality of sprag insertion holes 7a formed in the ribbon spring 7 but with a different phase. Thus, in the illustrated embodiment, a plurality of wrinkles 7e are also provided at the same pitch, and each of the wrinkles 7e is defined by a crooked portion formed in the side sections 7b and 7b and also in the tab 7d as extending in the transverse direction. On the other hand, the linear bending location 17 is set at the middle between the two adjacent wrinkles 7e and 7e. In the present embodiment, since the ribbon spring 7 is bent at a plurality of bending locations 17, the overall shape of this ribbon spring 7 is already circular.

In the above-described embodiments having a plurality of linear bending locations at each end portion, a plurality of linear bending locations 17 are provided at the same pitch as that of a plurality of sprag insertion holes 7a, i.e., one linear bending location 17 for the corresponding sprag insertion hole 7a. However, as alternative structures, such a plurality of bending locations 17 may be provided at a pitch different from the pitch of the sprag insertion holes 7a, or the bending locations may also be provided at a varying pitch, if desired. Besides, two or more linear bending locations 17 may also be provided for each of the sprag insertion holes 7a, if desired. Moreover, in the embodiments described above, a plurality of bending locations 17 are provided same in number and same in location at each end portion, i.e., symmetrically with respect to the center of the ribbon spring 7i such bending locations 17 may be provided different in number and/or position in each of the end portions.

Figure 9A:
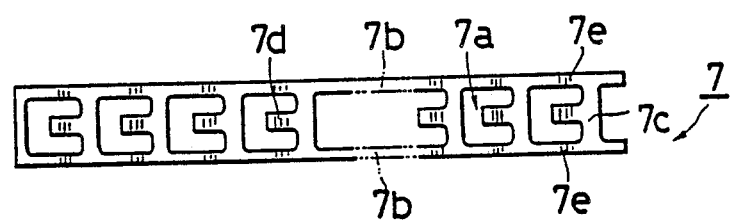
FIGS. 9a and 9b show a still further embodiment of the present in which each end portion is curved by bending.
Figure 9B:

FIGS. 9a and 9b show a ribbon spring 7 constructed in accordance with a still further embodiment of the present invention. In the present embodiment, bending has been applied to each of the end portions of the ribbon spring 7 to provide a curved end portion defined by a predetermined radius of curvature R. As an alternative structure, the curved end portion may be defined by a radius of curvature R which varies in value continuously or continually at least partly. Such a curved end portion may be provided only to one end portion of the ribbon spring 7. Besides, such a curved bending characteristic may be applied to the ribbon spring 7 along its entire longitudinal length. In this case, the ribbon spring 7 after having been subjected to a bending process is formed to have a circular shape as a whole.

In any of the above-described various modifications, a joint between the both end portions of the ribbon spring 7 when assembled in a one-way clutch 1 will have the condition illustrated in FIG. 10, so that the both end portions of the ribbon spring 7 will be oriented substantially in the circular direction with one overlying the other. As a result, the stress produced in the ribbon spring 7 will be substantially uniform all along its entire length in the longitudinal direction. In addition, each of the sprags 6 in the one-way clutch 1 will have substantially the same moment, and, thus, there is provided a one-way clutch 1 well-balanced in characteristic and performance as a whole. In addition, since there is no portion of the ribbon spring 7 which is locally scraped against any other object under pressure, the life of the ribbon spring 7 is prolonged, which, in turn, could contribute to prolong the life of the one-way clutch 1 itself.

Figure 11:
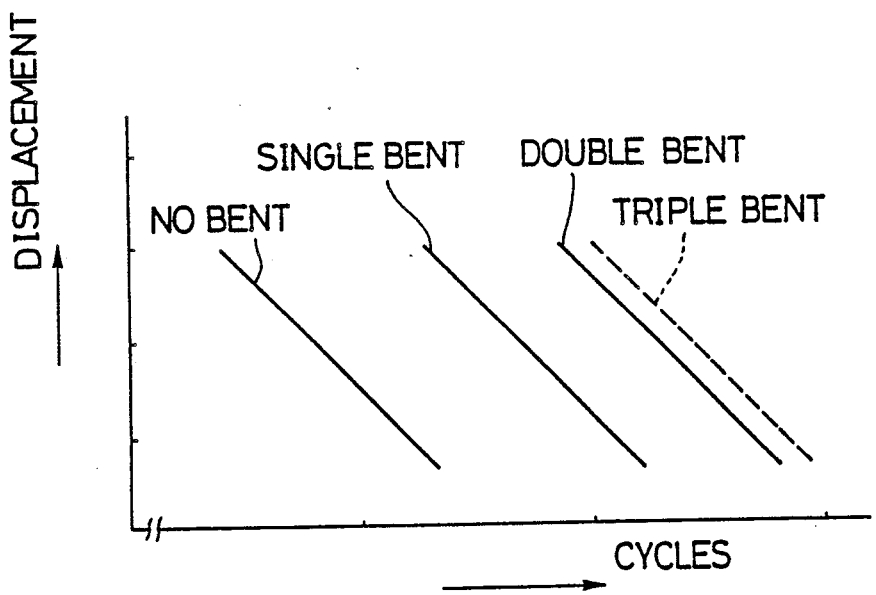
FIG. 11 is a graph showing the experimental results for failure of the present invention and the prior art.

FIG. 11 is a graph showing the plotting of the experimental results for the breakage life for the case in which no bending has been applied to both end portions of a ribbon spring 7 and for the case in which bending has been applied to both end portions of a ribbon spring 7 in accordance with the present invention. In the graph of FIG. 11, the abscissa is the number of cycles of a repeated load applied to the ribbon spring 7 and the ordinate is the breakage displacement at an end portion. As is obvious from this graph, in the case where no bending has been applied, a predetermined breakage displacement level occurs at an early stage; however, by applying bending in accordance with the present invention, the life of the ribbon spring 7 is significantly improved. It is to be noted that the graph of FIG. 11 is a semi-log plot and the abscissa is a logarithmic scale. Thus, by applying bending to a ribbon spring in accordance with the present invention, and, furthermore, by increasing the number of bending locations to be applied to the ribbon spring, there is provided an increased improvement in the characteristic and performance of the ribbon spring.

As described above, in accordance with the present invention, wear of a ribbon spring is either reduced or avoided, so that the life of a ribbon spring can be prolonged. In addition, the present ribbon spring is arranged to define a circle which is close to a true circle as much as possible when assembled into a one-way clutch, and, in particular, the end portions are oriented substantially in a circular direction at a joint, so that the stress produced in the present ribbon spring becomes substantially uniform in its entirety and the moment applied to each of the sprags becomes substantially uniform. As a result, there can be provided a one-way clutch which is well-balanced in characteristic and performance as a whole and which is smooth in operation without the presence of undesired and undue force.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A sprag-synchronized one-way clutch, comprising:
   at least one retainer ring provided with a plurality of srpag insertion holes;
   a plurality of sprags each inserted in a corresponding one of said plurality of sprag insertion holes; and
   a ribbon spring comprised of an elongated thin plate of a material which is formed with a plurality of sprag insertion holes, each hole having a predetermined shape, at a predetermined pitch, at least one end portion of said thin plate being bent such that both end portions of said thin plate substantially overlie one another to thereby extend substantially along a circle and are spaced away from each of said at least one retainer ring such that said ribbon ring is prevented from being brought into frictional contact with each of said at least one retainer ring.

2. The clutch of claim 1, wherein said thin plate is pre-bent into at least a partly curved configuration.

3. The clutch of claim 1, wherein said predetermined direction is the same direction as a direction in which said ribbon spring is brought into a circular shape when assembled into said one-way clutch.

4. The clutch of claim 1 wherein said thin plate is formed with a plurality of wrinkles at a predetermined pitch along a longitudinal direction of said thin plate and wherein said pre-bend is applied at a location between two adjacent ones of said plurality of wrinkles and said overlapping end portions when assembled extend between a pair of wrinkles.

5. The clutch of claim 1, wherein said at least one retainer ring includes an outer retainer ring.

6. The clutch of claim 5, further comprising a inner retainer ring provided with a plurality of sprag insertion holes each of which receives therein a corresponding one of said plurality of sprags.

* * * * *